June 9, 1964
J. R. PREZIOSI
3,136,017
FASTENING DEVICE
Filed Aug. 1, 1961
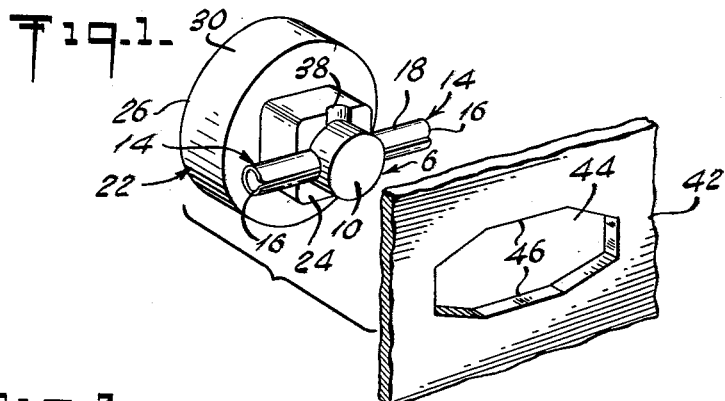
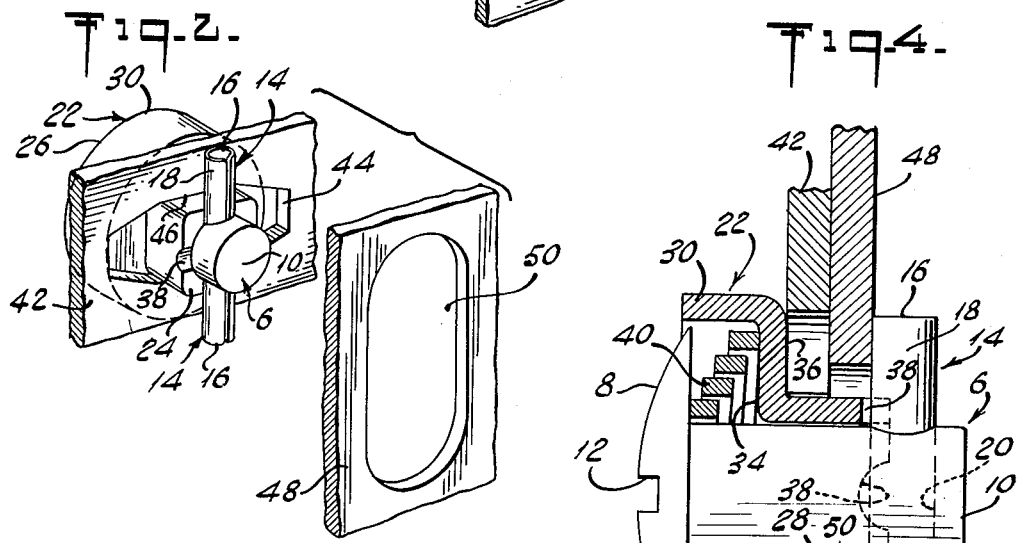
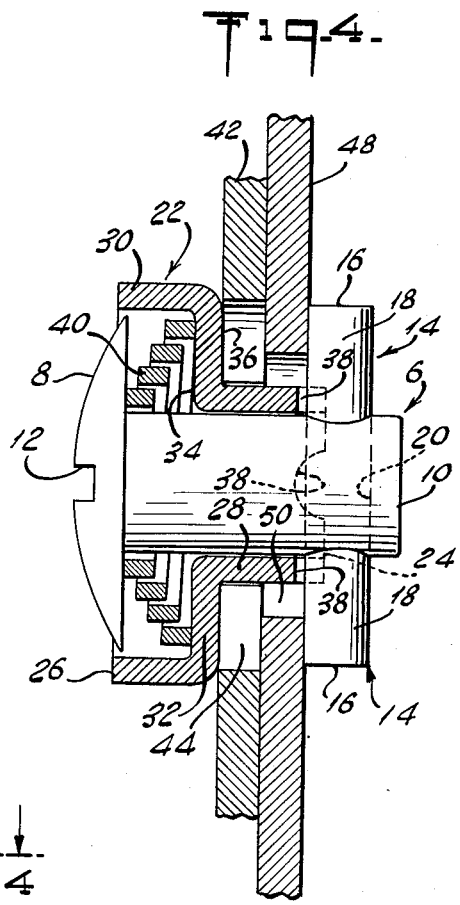
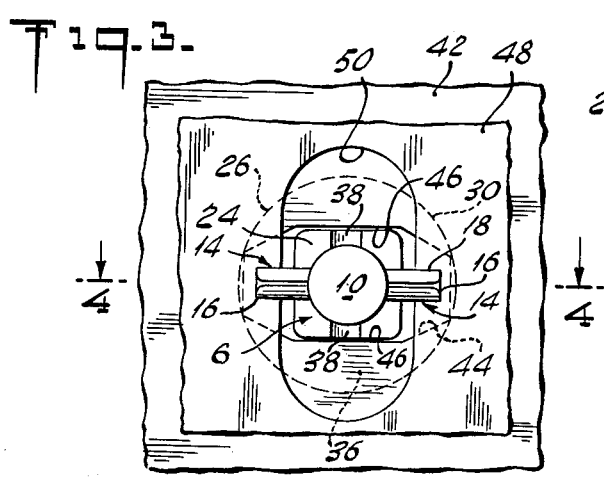
INVENTOR
JOSEPH R. PREZIOSI
BY Richard A. Craig
ATTORNEY

United States Patent Office 3,136,017
Patented June 9, 1964

3,136,017
FASTENING DEVICE
Joseph R. Preziosi, Newark, N.J., assignor to Elastic Stop Nut Corporation of America, Union, N.J., a corporation of New Jersey
Filed Aug. 1, 1961, Ser. No. 128,477
6 Claims. (Cl. 24—221)

This invention relates to fastening devices and more particularly to a quick release fastener for use in joining together a plurality of work pieces such as a pair of apertured panels.

Many prior quick release fasteners are complex and include a retainer which must be preassembled to one of the two panels, as by riveting or welding. This is a costly, time-consuming operation, especially since the usual application requires the use of several or even many such prior fasteners. Also, many prior quick release fasteners require the use of special installation tools.

This invention provides a simple, inexpensive quick release fastener all parts of which are preassembled with each other as a unit prior to assembly with any panel. No special installation tools are required. The fastener can then readily be assembled with one of the panels and then just as readily the joining of the two panels can be completed by a simple ¼ turn of certain parts of the fastener. The connection of the panels is then just as easily broken.

The present invention thus overcomes the need for pre-attachment of any part of the fastener to one of the panels.

Important objects of the invention are to provide a quick release fastener having the above advantages.

A quick release fastener according to the invention comprises a stud having a head and a shank, a pair of projections extending outwardly from the shank, a receptacle including an annular portion having external wrenching surfaces and a pair of radial grooves at and in open communication with one end of the annular portion. The stud shank extends through the annular portion with the stud head remote from the grooved end of the annular portion of the receptacle. The fastener also includes resilient means biasing the projections against the grooved end.

The above and other objects and advantages will appear from the following description of a preferred example of the invention and the accompanying drawings in which:

FIG. 1 is a perspective view of a quick release fastener according to the invention and a first panel, the fastener and the panel positioned for assembly with each other;

FIG. 2 is a perspective view of the fastener of FIG. 1 assembled with the panel of FIG. 1, and a second panel positioned to be connected to the first panel by the fastener;

FIG. 3 is a plan view showing the first and second panels connected by the fastener, from the side of the connection remote from the first panel; and FIG. 4 is a view on line 4—4 of FIG. 3.

The drawings show a quick release fastener which includes a stud 6 defining an axis and having a round head 8 at one end and a cylindrical shank 10. Stud head 8 has a slot 12 adapted for engagement by a screw driver or the like, to operate the fastener in a manner which will be described later. The fastener also has a pair of diametrically opposed projections 14 axially spaced a predetermined distance from head 8 and extending outwardly from shank 10 and having free ends 16 spaced a predetermined distance from each other and substantially equidistant from the axis of stud 6.

In the illustrated example of the invention, projections 14 are provided by a cylindrical spring pin 18 in frictional engagement with the wall of a cylindrical hole 20 through shank 10. The axis of hole 20 intersects the stud axis at right angles thereto and is spaced from head 8 a distance equal to one-half the diameter of hole 20 plus the predetermined distance between head 8 and projections 14.

Projections 14 could, if desired, be provided in other ways.

The fastener further includes a receptacle 22 having first and second ends 24 and 26, respectively, a first annular portion 28 of substantially square external configuration extending from end 24 toward end 26 and a second annular portion 30 extending from end 26 toward end 24 and transversely larger than annular portion 28. Receptacle 22 further has a disc-like central portion 32 joining annular portions 28 and 30 and having an internal surface 34 facing away from end 24 and an external surface 36 facing away from end 26.

The inner surface of annular portion 28 is cylindrical and of a diameter slightly greater than the diameter of stud shank 10 and the inner surface of annular portion 30 is cylindrical and of a diameter slightly greater than the diameter of stud head 8.

The distance across the flats of the square of annular portion 28 is less than the predetermined distance between free ends 16 of projections 14, i.e., the length of pin 18.

The square external configuration of annular portion 28 provides portion 28 with two pairs of oppositely-facing external wrenching surfaces, the function of which will be described later.

Receptacle 22 further has four radial semicylindrical grooves 38 in open communication with end 24 of receptacle 22 and with the inner surface of annular portion 28 and with the exterior of annular portion 28. The axes of grooves 38 intersect the axis of the inner surface of annular portion 28 at a common point and are at right angles thereto. Further, the axes of grooves 38 are spaced at right angles to each other and are so oriented that the axis of each groove 38 is perpendicular to one of the four sides of the square of annular portion 28.

Thus, receptacle 22 is provided with two pairs of aligned radial grooves 38.

The diameter of grooves 38 is slightly greater than the diameter of pin 18, so that the latter can impositively engage either pair of aligned grooves 38.

The axial distance between internal surface 34 of disc-like portion 32 and end 24 of receptacle 22 is less than the predetermined axial distance between head 8 and projections 14.

The fastener also includes a spirally-wound coil spring 40.

The various parts of the fastener are assembled with shank 10 passing through annular portion 28 with head 8 remote from end 24 of receptacle 22 and projections 14 remote from end 26 of receptacle 22 and with spring 40 in annular portion 30 and surrounding shank 10 and located between head 8 and internal surface 34 of disc-like portion 32. The end of spring 40 of small diameter bears against head 8 and the end of spring 40 of large diameter bears against surface 34. Spring 40 is under compression, thus to provide the fastener with resilient means biasing projections 14 against end 24 of receptacle 22.

Projections 14, which overlap end 24 of receptacle 22, are formed after stud 6 and receptacle 22 are assembled as aforesaid.

As shown in FIG. 1, projections 14, i.e., the two ends of pin 18, are located in one of the two pairs of aligned grooves 38. FIG. 1 also shows a first or outer panel 42 having an elongated hole 44 therethrough. The length of hole 44 is greater than the length of pin 18 and the width of hole 44 is less than the external diameter of annular portion 30 of receptacle 22. More precisely, hole 44 has confronting parallel side surfaces 46 spaced apart a distance slightly greater than the distance across the flats of the square of annular portion 28 of receptacle 22 and less than the distance between the free ends of projections 14.

Thus, by aligning the fastener and panel 42 as shown in FIG. 1, with pin 18 engaging one pair of aligned grooves 38 and with the longitudinal dimension of pin 18 corresponding with the longitudinal dimension of hole 44, it is a simple matter to assemble the fastener and panel 42 by abutting external surface 36 against panel 42 and turning (as by a screw driver engaging slot 12) stud 6 90° in either direction. At the end of this turning, projections 14 enter the other of the two pairs of aligned recesses 38 and are impositively held therein by spring 40.

During the assembly of the fastener and panel 42, the end of shank 10 remote from head 8, projections 14 (pin 18) and annular portion 28 pass through hole 46, and an opposite pair of sides of the square of annular portion 28 serve as wrenching surfaces by confronting side surfaces 46 of hole 44 so that receptacle 22 can not rotate therein.

At this point, the fastener and panel 42 are related as shown in FIG. 2, with projections 14 overlapping panel 42 adjacent side surfaces 46 of hole 44.

The drawings also show a second panel 48, which is to be connected to panel 42 by the fastener. Panel 48 has an elongated aperture 50 therethrough, the length of which is greater than the distance between the free ends of projections 14, i.e., the length of pin 18. The width of aperture 50 is greater than the across the flats dimension of the square of annular portion 28 but less than the distance between the free ends of projections 14.

Preparatory to effecting the connecting of panels 42 and 48 and after the fastener has been assembled with panel 42 as aforesaid, the parts are positioned as shown in FIG. 2, the longitudinal dimension of aperture 50 being aligned with projections 14 (pin 18). To effect the connection referred to, panel 48 is brought into abutting relationship with panel 42, with the end of annular portion 28 remote from disc-like portion 32 and projections 14 (pin 18) passing through aperture 50, and stud 6 is again rotated 90° in either direction, until projections 14 enter the same pair of grooves 38 which they originally occupied prior to the assembly of the fastener and panel 42. The connection is now complete, panels 42 and 48 being clamped between projections 14 and surface 36, as shown in FIGS. 3 and 4.

The combined thickness of panels 42 and 48 is at least equal to the axial length of annular portion 28 from surface 36 to the bottoms of grooves 38 and is less than the entire axial length of annular portion 28.

To break the connection, it is merely necessary again to rotate stud 6 and projections 14 90° in either direction, to realign projections 14 with the longitudinal dimension of aperture 50.

If desired, annular portion 30 and/or one of the two illustrated pairs of aligned grooves 38 may be omitted. In the latter event, projections 14 would not be in engagement with any grooves when in the position indicated in FIG. 2.

Furthermore, by providing appropriate stops on receptacle 22, the fastener could be modified so as to be locked by movement in one rotational sense only and unlocked by movement in the opposite rotational sense.

The invention is well adapted to the attainment of the above objects and advantages and others. For example, a quick release fastener according to the invention is easily replaced, can accommodate a wide range of panel hole misalignment and does not mar or otherwise damage panels with which it is used.

Many changes in the details of the disclosed example can be made without departing from the invention. Accordingly, except as they may be included in the appended claims, those details are not to be taken as limitations on the invention.

What is claimed is:
1. A quick release fastener comprising a stud defining an axis and having a head and a shank, a pair of diametrically opposed projections axially spaced from said head and extending outwardly from said shank and having free ends equally spaced from said axis, a receptacle surrounding said shank and including an annular portion having two pairs of oppositely-facing external wrenching surfaces located closer to said axis than said free ends, said receptacle further having a flange having a clamping surface facing away from said head and extending outwardly from the axial ends of said wrenching surfaces adjacent said head, and resilient means biasing said projections against the axial end of said annular portion remote from said head, said stud being rotatable with respect to said receptacle between a first locking position in which said projections extend transversely beyond one said pair of wrenching surfaces and a second locking position in which said projections extend transversely beyond the other said pair of wrenching surfaces.

2. The invention set forth in claim 1 wherein said wrenching surfaces substantially define a square.

3. The invention set forth in claim 2 wherein said receptacle includes a first pair of aligned grooves to engage said projections with said stud in said first locking position and a second pair of aligned grooves to engage said projections with said stud in said second locking position.

4. The invention set forth in claim 1 wherein said head is axially spaced from said flange and said resilient means is provided by a coil spring surrounding said shank and under compression between said flange and said head.

5. The invention set forth in claim 1 wherein said shank has a transverse hole therethrough and said projections are provided by a pin extending through said hole and in frictional engagement with the wall thereof.

6. The invention set forth in claim 5 wherein said pin is of the spring pin type.

References Cited in the file of this patent

UNITED STATES PATENTS

| 906,607 | Bessette | Dec. 15, 1908 |
| 1,335,363 | Bourque | Mar. 30, 1920 |
| 1,672,333 | Miller | June 5, 1928 |

FOREIGN PATENTS

| 490,718 | Great Britain | Aug. 19, 1938 |
| 1,026,519 | France | Feb. 4, 1953 |